3,539,686
PIGMENTATION IN POULTRY HUSBANDRY
Ralph Rosenberg, 9814 W. Broadview Drive,
Bay Harbor Islands, Fla.
No Drawing. Filed Apr. 10, 1967, Ser. No. 629,410
Int. Cl. A01n 9/02, 9/08
U.S. Cl. 424—195                                 6 Claims

ABSTRACT OF THE DISCLOSURE

Pigmentation in poultry husbandry, i.e. of the body tissue and the egg yolk, results from the presence of carotenoids in the poultry ration. Synergistic pigmenting effects are achieved when the carotenoid-content of the ration fed to poultry, e.g. laying hens, is a combination comprising:

(A) A member of the group consisting of xanthophyll and zeaxanthin, and (B) A member of the group consisting of canthaxanthin, paprika oleoresin, beta-apo-8-carotenal and beta-apo-8-carotenoic acid ethyl ester.

---

This invention relates to the pigmentation of poultry as a result of the presence of carotenoids in poultry feeds. The pigmentation is exhibited by the color of the egg yolks and the body tissues. More particularly, this invention is directed especially to the synergistic pigmenting effects produced by supplements which are added to carotenoid-free poultry feeds. Such supplements are mixtures composed mainly of xanthophyll or zeaxanthin combined with certain synthetic or natural carotenoids.

During the course of the investigations which resulted in this invention I found that the inclusion of a supplement which solely provided 70 grams of xanthophyll per short ton of carotenoid-free poultry ration when fed to laying hens resulted in eggs having a yolk color, on the NEPA scale, of 5.2.

The xanthophyll content of the supplements used in carrying out the investigations which led to this invention was obtained by the extraction thereof from marigold blossoms.

The carotenoid-containing supplements used herein were in dry, stabilized form, of the kind of type described in my pending application, Ser. No. 541,109, filed Apr. 8, 1966, as well as other types, such as:

(A) Beads or beadlets consisting of carotenoid-containing beads of fats or waxes produced by the spray-chilling of solutions of carotenoid in molten fats and/or waxes;

(B) Beads consisting of fatty or waxy cores containing carotenoid, which cores are enveloped by a water-soluble or a water dispersible shell, obtained as a result of spray-drying a mixture of the core-forming material, the carotenoid and the shell-forming substance;

(C) Beads consisting of those having the structure of the just mentioned type B which are produced as a result of encasing type B in a protective fatty or waxy outer shell, obtained by the spray-chilling of a composition consisting of a distribution of beads of structure B in a molten fat or wax.

It is known that xanthophyll produces a yellow-gold coloration of the egg yolk; and that the intensity of the color is stated on the NEPA (National Egg Producers Association) scale. The use of feed ingredients containing carotenoids from natural sources, e.g.: alfalfa, corn, etc., limits greatly the intensity of pigmentation that can be achieved at reasonable levels of addition thereof to a carotenoid-free ration.

I discovered that the addition to xanthophyll of relatively small amounts of a synthetic carotenoid (beta-apo-8 carotenal) at levels of 3% to 10%, by assay, of the xanthophyll content produced a much more intense pigmentation than could be produced by feeding either one alone. It appears, from testing carried out, that the best combination is produced at a level of 7%–10% addition, although the color hue continues to improve up to the addition of 20%.

I have also found that similar experimentation with canthaxanthin produces the same kind of results with the exception that such combination produces a good orange color.

I have also carried out experimentation by using a paprika oleoresin (the carotenoids thereof being capsanthin and capsorbin) combined with the two just mentioned synthetic carotenoids, and obtained synergistic effects.

When canthaxanthin was fed alone, that is, when it is the sole carotenoid of the poultry feed, it imparts a pink-to-red color to the egg yolk, and when the egg is boiled or fried, more than half of the color is lost. However, this does not occur when a combination of the xanthophyll with the synthetic is used, and a more pleasing orange-to-red are produced.

I have also observed that the combinations of xanthophyll together with the carotenoids of paprika oleoresin produces an orange color that could not be previously achieved. I find that by adjusting the levels of one or the other carotenoids I can adjust the hue of the egg yolk and broiler pigmentation. Although paprika oleoresin alone will not pigment broilers, the combination thereof with xanthopyhll will produce the desired broiler pigmentation.

In carrying out the investigations which resulted in the present invention I used as the basic carotenoid-free ration the following:

HEN RATION

| Ingredient: | Percent |
|---|---|
| Fish meal | 5.0 |
| Oyster shell | 3.5 |
| Defluorinated rock phosphate | 2.25 |
| Salt | .25 |
| Soybean oil meal (45% protein) | 19.0 |
| Milo | 69.5 |
| Vitamin mineral premix | .5 |

I found that the addition or supplementation of the above basic ration with 70 grams of xanthophyll per ton of feed produced egg yolks having a NEPA member of 5.2.

When a portion of the xanthophyll was replaced or substituted by the other carotenoids just mentioned, these resulted in a synergistically induced coloration of the egg yolk (as compared with intensity noted on the NEPA scale for either of the carotenoids alone.

The following are the results of data accumulated in studying the effects (individually), and of the synergistic combinations of carotenoids (both synthetic and natural) based on the inclusion of a total of 70 grams of carotenoid per short-ton of the feed:

| | |
|---|---|
| Xanthophyll | NEPA 5.2. |
| Canthaxanthin | 5.2 (Pinkish NEPA equivalent). |
| Paprika Oleoresin (100,000 color value, 95% Capsanthin) | 5.4 (Pinkish NEPA equivalent). |
| Beta-apo-8-carotenal | 5.3 NEPA equiv. |

|                                              | NEPA equivalent |
| --- | --- |
| 98% xanthophyll plus 2% beta-apo-8-carotenal | 5.6 |
| 95% xanthophyll plus 5% beta-apo-8-carotenal | 6.1 |
| 93% xanthophyll pus 7% beta-apo-8-carotenal | 6.4 |
| 90% xanthophyll plus 10% beta-apo-8-carotenal | 6.5 |
| 80% xanthophyll plus 20% beta-apo-8-carotenal | 6.8 |
| 90% xanthophyll plus 10% paprika oleoresin | 5.4 |
| 85% xanthophyll plus 15% paprika oleoresin (Orange) | 5.6 |
| 80% xanthophyll plus 20% paprika oleoresin (Orange) | 5.9 |
| 96% xanthophyll plus 4% canthaxanthin | 5.9 |
| 90% xanthophyll plus 10% canthaxanthin (Orange) | 6.2 |

The following are preparations and examples in accordance with this invention.

The carotenoid products contained anti-oxidants such as Santoquin, BHT and a chelating agent such as ethylenediaminetetraacetic acid (EDTA) or a salt thereof, e.g. Versene.

PREPARATION 1

A waxlike xanthophyll concentrate was obtained from dried marigold blossoms. The marigold blossoms (one part) were extracted with 10 parts of hexane. The extract was filtered; and the filtrate concentrated by evaporation of the solvent, preferably under vacuum. This fluid concentrate had a solids content of 40–45% and a solvent content of 60–55%. The solids contained about 60 grams of xanthophyll per pound.

The concentrate is taken up in a vegetable oil—e.g. corn oil—to provide a fluidized xanthophyll concentrate containing about 40 grams of xanthophyll per pound.

This xanthophyll-in-oil material is charged to a vessel containing a molten hydrogenated fat (hydrogenated soy oil or tallow (M.P. 55° C.), preferably under a blanket of an inert gas, for example: Nitrogen in the following proportions:

40 parts of motlen high melting fat and
60 parts of the xanthophyll-in-oil solution.

After thorough mixing the molten material is spray-chilled.

The obtained beads (diameter of about 0.2 mm.) are incorporated in an amount to provide 70 grams of xanthophyll per short tone of the above described poultry ration. When fed to laying hens, the yolks of the eggs produced have an NEPA number of 5.2.

As has been noted the beads of this preparation can be produced to contain anti-oxidant, surface active agent, and chelating agent in the respective amounts of:

|  | Percent |
| --- | --- |
| Anti-oxidant | 1.0 |
| Surface active agent (Tween 40 or lecithin) | 1.0 |
| Chelating agent | .2 | to provide for greater stability of the xanthophyll-containing beads.

PREPARATION 2

A first tank is charged with 480 pounds of water (preferably distilled or de-ionized) at ambient temperature. To it is added 170 pounds of powdered skim milk. The mixture is heated to 165° F.; and agitated to effect thorough dispersion of the skim milk which is completed in about 25 minutes.

A second tank is charged with 55 pounds of molten hydrogenated soy oil (M.P. 70° C.). To it is added 45 pounds of a vegetable (corn) oil solution of xanthophyll, as described in Preparation 1, and agitated to effect solution of the xanthophyll in the molten fat.

Then the contents of the first tank are transferred to the second tank; and the fluid mass thoroughly mixed while bubbling nitrogen therethrough. The mixture is then passed through a homogenizer operating under a pressure of 2500–3000 pounds. The homogenizate thus produced is collected in a jacketed holding tank. From the holding tank the homogenizate is fed to a spray drier where the homogenizate undergoes atomization and evaporation of water which results in the formation of a mass of tiny beads consisting of fatty core or cores of xanthophyll surrounded by a non-fat shell.

PREPARATION 3

A tank is charged with 300 pounds of hydrogenated soy oil (M.P. 70° C.), 3 pounds of Tween 40 and 3 pounds of Ethoxyquin. The mixture is agitated to effect dissolution of the additives. To it is then added 200 pounds of the beads produced in Preparation 2. The mass is thoroughly mixed under nitrogen and spray-chilled to produce a mass of beads.

PREPARATION 4

Step A

One part by weight of dried marigold blossoms is extracted with 10 parts of hexane. The extract is filtered and the filtrate concentrated by the evaporation of the solvent (preferably under vacuum).

Step B 100 parts of the fluid concentrate produced in Step A (40% solids) contained in a vessel provided with an agitator (desirably under an inert gas), e.g. nitrogen, are added (preferably slowly) to 24 to 36 parts of powdered hydrated silica (available commercially as HiSil 233, Pittsburgh Plate Glass Co.). The mass is agitated vigorously and passed through a mechanical homogenizer.

Step C

The fluid mixture produced in Step B, a slurry, is pumped into a drum drier maintained under a vacuum of 29 inches of mercury and a temperature of 160° F.

The powdered final product consists of the powdered vehicular material containing xanthophyll bound therein.

This product when added to the above-described basic carotenoid-free ration to provide an xanthophyll content of 70 grams per short ton produces colored egg yolks having a NEPA number of 5.2.

The vehicular carrier for the xanthophyll can be fire-dry 90% fused silica (available commercially as Cab-O-Sil, Cabot Corporation, Boston, Mass.).

The vehicular material may also be a synthetic calcium silicate (available commercially as Micro-Cel T4, Johns-Manville, New York, N.Y.

Any of these products can also contain antioxidants such as BHT, a surface active agent, and chelating agents as described.

In lieu of the purely inorganic vehicular material for the xanthophyll just described, I can use a mixture of equal parts by weight of milk solids not fat and Dextrin (available commercially as Nadex 772, National Starch and Chemical Corporation, New York, N.Y.). There can also be included BHT and tetra-sodium ethylenediaminetetraacetate.

EXAMPLE 1

Part A (a) In accordance with the method described in Step A of Preparation 4, there is prepared a concentrate of the material extracted by hexane from the dried marigold blossoms.

(b) There is also prepared a hexane solution of beta-apo-8-carotenal. Further, there are preferably added to the hexane solution, anti-oxidants, as described above.

Part B

In accordance with the method described in Step B of Preparation 4 there is added to 24 to 36 parts of HiSil 233, some of solutions (a) and (b) of Part A of this example. This addition provides the two carotenoids (in a total carotenoid content as in Step B of Preparation 4) whereof they are present as follows:

98%, by carotenoid analysis of xanthophyll, and
2%, by carotenoid analysis of the beta-apo-8-carotenal

Part C

The fluid mixture produced in Part B is pumped into a drum drier which is operated as described in Step C of preparation 4, to produce a final product consisting of the powdered vehicular material containing the two carotenoids bound therein.

Part D

The product of Part C was added to the above-described basic carotenoid-free ration to provide a ration having a total carotenoid content of 70 grams per short ton of the ration produced.

When this ration was fed to laying hens, the color of the egg yolk had a NEPA equivalent intensity of 5.6.

EXAMPLE 2

A ration akin to that of Example 1 was prepared in accordance with Parts A, B, C and D of that example except that the proportions of the two carotenoids, by carotenoid analysis, were:

95% xanthophyll
5% beta-apo-8-carotenal

When the ration of this example was fed to laying hens, the color of the egg yoldks had a NEPA equivalent intensity of 6.1.

EXAMPLE 3

In accordance with the general method described in Examples 1 and 2, a ration akin to that of those examples was prepared in accordance with Parts A, B, C and D thereof except that the proportions of the two carotenoids, by carotenoid analysis were:

93% xanthophyll
7% beta-apo-8-carotenal

When the ration of this example was fed to laying hens, the color of the egg yolks had a NEPA equivalent intensity of 6.4.

EXAMPLE 4

In accordance with the general method just described there was prepared a ration akin to that of Example 1 in accordance with Parts A, B, C and D thereof except that the proportions of the two carotenoids by carotenoid analysis were 90% xanthophyll, 10% beta-apo-8-carotenal.

When the ration of this Example was fed to laying hens, the color of the egg yolks had a NEPA equivalent intensity of 6.5.

EXAMPLE 5

In accordance with the general method described above there were prepared the components of and a final ration akin to the foregoing examples except that the proportions of the two carotenoids, by carotenoid analysis, were 80% xanthophyll and 20% beta-apo-8-carotenal.

When the ration of this example was fed to laying hens the color of the egg yolks had a NEPA equivalent intensity of 6.8.

EXAMPLE 6

In accordance with the method described in Example 1, there is prepared a poultry ration containing, per short ton, 70 grams of a mixture of carotenoids consisting of xanthophyll and paprika oleoresin (100,000 color value, 95% capsanthin).

The proportion of the xanthophyll to the oleoresin, by carotenoid analysis, is 90%:10%. The mixture is prepared as follows: to a concentrate of the xanthophyll as extracted from dried marigold blossoms as described in Example 1, Part A, there is added the oleoresin to provide the just-mentioned proportion.

To the mixture of the xanthophyll and oleoresin, in hexane, including preferably anti-oxidant, there is added the HiSil as described in Example 1, and the mass is drum-dried as described in that example. Then this dry product was added to one short ton of the basic poultry ration to provide a total carotenoid content of 70 grams, as described in Part D of Example 1.

When this ration was fed to laying hens, the color of the egg yolk had a NEPA equivalent intensity of 5.4.

When the ration fed to laying hens contained a carotenoid combination of 70 grams of 85% xanthophyll and 15% oleoresin, the color of the egg yolk was orange of a NEPA equivalent of 5.6.

When the ration fed to laying hens contained, per short ton of the above feed per 70 grams of a carotenoid combination of 80% xanthophyll and 20% of the oleoresin, the color of the egg yolks are orange of a NEPA equivalent of 5.9.

EXAMPLE 7

In accordance with Example 1, there is prepared a poultry ration containing, per short ton, 70 grams of a mixture of carotenoids consisting of xanthophyll and canthaxanthin.

The xanthophyll: canthaxanthin, by carotenoid analysis, proportion is 96%:4%. The mixture is prepared as follows: to a concentrate of the xanthophyll as extracted from dried marigold blossoms as described in Example 1, Part A, there is added the canthaxanthin to provide the just mentioned proportion.

To the mixture of the xanthophyll and canthaxanthin, in hexane, including preferably, an anti-oxidant, there is added the HiSil as described in the Example 1, and the mass is drum dried as described in that example. This dry product was added to the aforesaid basic poultry ration to provide a total carotenoid content of 70 grams per short ton of the ration as described above, the carotenoid content being proportioned as follows: xanthophyll—96%; and canthaxanthin—4%.

When this ration was fed to laying hens the color of the egg yolk had an intensity of a 5.9 NEPA equivalent.

EXAMPLE 8

A poultry ration was prepared in accordance with the general procedure described in Example 7, except that the carotenoid combination thereof (70 grams per short ton of the ration) consisted of xanthophyll—90%; and canthaxanthin—10%.

When this ration was fed to laying hens, the color of the egg yolks was orange and had a NEPA equivalent of 6.2.

I also found that similar pigmenting effects are produced when beta-apo-8-carotenoid acid ethyl ester is used in place of the beta-apo-8-carotenal as has been described.

I have also found that zeaxanthin produces pigmenting effects similar to xanthophyll when used, as has been described, in place of the xanthophyll.

It is to be understood that the anti-oxidants, sequestering agents, surface active agent, etc., as have been described, are utilized in order to provide for stability of the pigmenting supplement and the dispersal thereof during digestion.

As has been mentioned, the synergistic pigmenting effect is a phenomenon of the combinations of the carotenoids as described; and that the synergistic combinations of the carotenoids are effective when the carotenoids are present in any of the supplements whereof the vehicular materials are as described in the Preparations set forth above. In short, the pigmenting effect is that of the combinations of the carotenoids; and the vehicular material used in making the supplements containing the pigmenting combinations is a matter of choice.

I claim:

1. A synergistic pigmenting composition for use in poultry husbandry comprising:
   (A) xanthophyll and
   (B) a member of the group consisting of canthaxanthin, paprika having 100,000 color value, 95% capsanthin, beta - apo - 8 - carotenal and beta-apo-8-carotenoic acid ethyl ester,
   wherein the proportion of the components A:B is 98–80% of A to 2–20% of B.

2. A composition in accordance with claim 1 wherein component B is beta-apo-8-carotenal.

3. A composition in accordance with claim 1 wherein component B is canthaxanthin.

4. A composition in accordance with claim 1 wherein component B is beta-apo-8-carotenoic acid ethyl ester.

5. A composition in accordance with claim 1 wherein component B is paprika oleoresin having 100,000 color value, 95% capsanthin.

6. Method of effecting pigmentation in poultry husbandry which comprises feeding to said poultry a carotenoid-containing ration whereof the cartenoid content is a synergistic combination in accordance with claim 10.

References Cited

OTHER REFERENCES

Burdick, E.: "Economic Botany," vol. 10, pp. 267–278 (1956).

Brubacher, G.: "Chem. Abstracts," vol. 65, p. 12627a (1966).

ALBERT T. MEYERS, Primary Examiner

V. D. TURNER, Assistant Examiner

U.S. Cl. X.R.

424—305, 333, 343; 99—2